March 9, 1948. E. BOECKING 2,437,239
FILM REGISTRY MEANS FOR MOTION-PICTURE PROJECTORS
Filed April 12, 1945 3 Sheets-Sheet 1

Inventor
Ewald Boecking
BY HIS ATTORNEYS
Howson and Howson

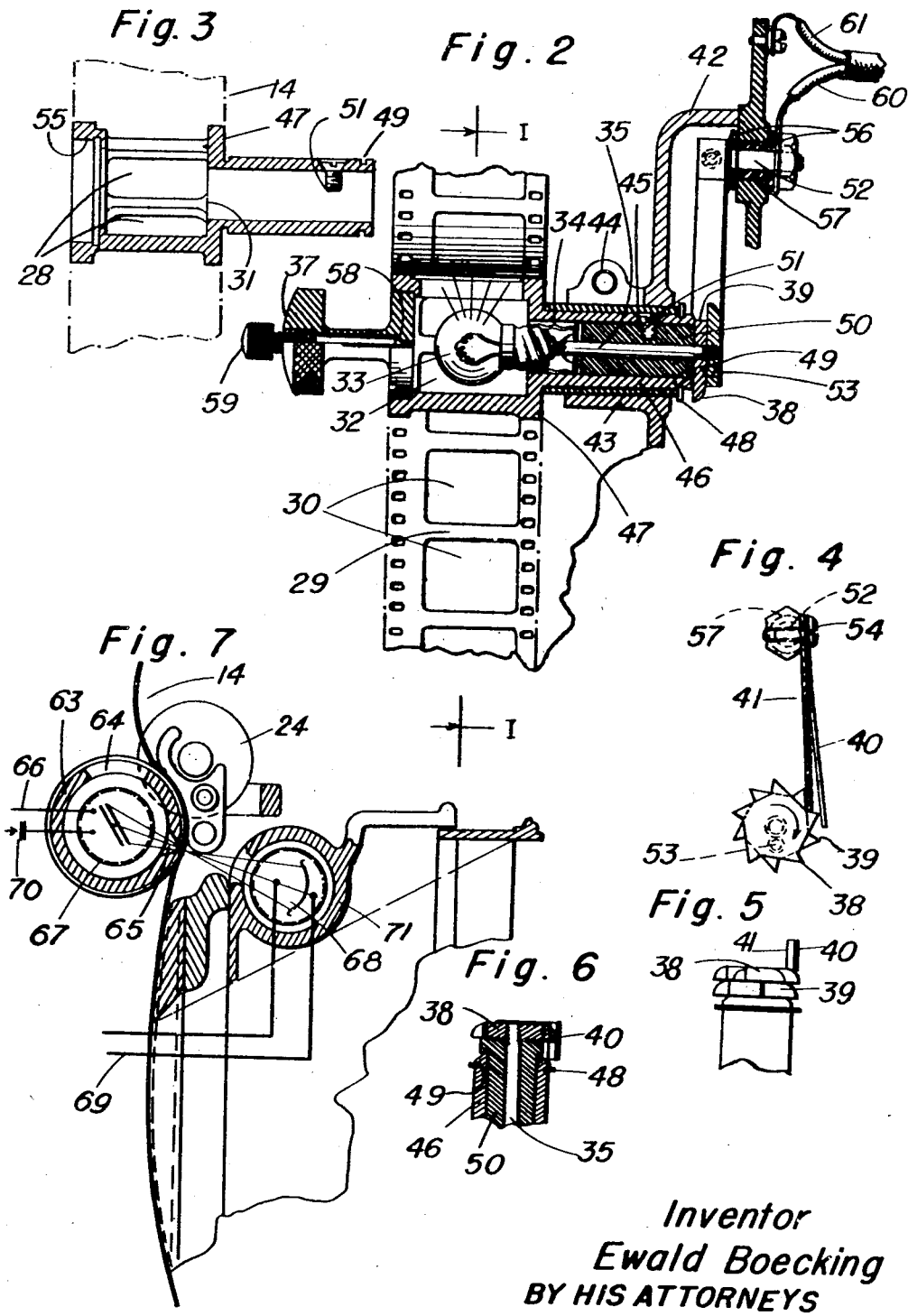

March 9, 1948. E. BOECKING 2,437,239
FILM REGISTRY MEANS FOR MOTION-PICTURE PROJECTORS
Filed April 12, 1945 3 Sheets-Sheet 3
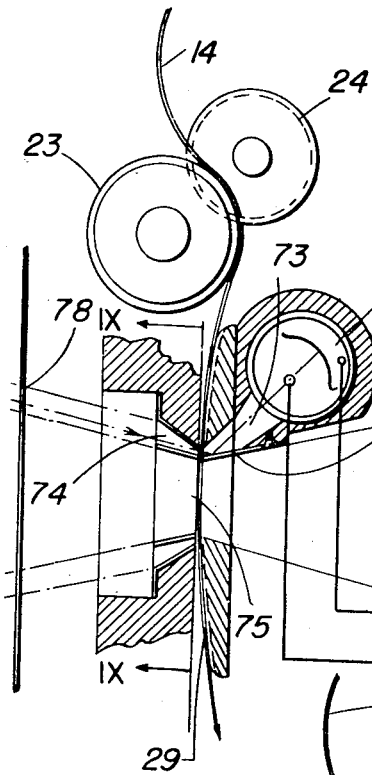
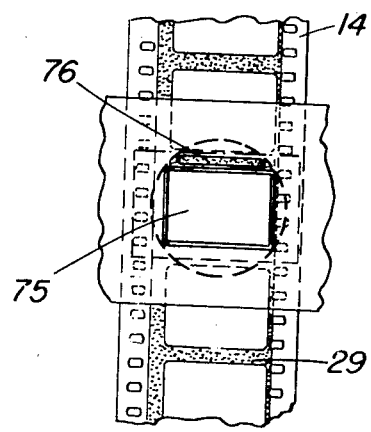
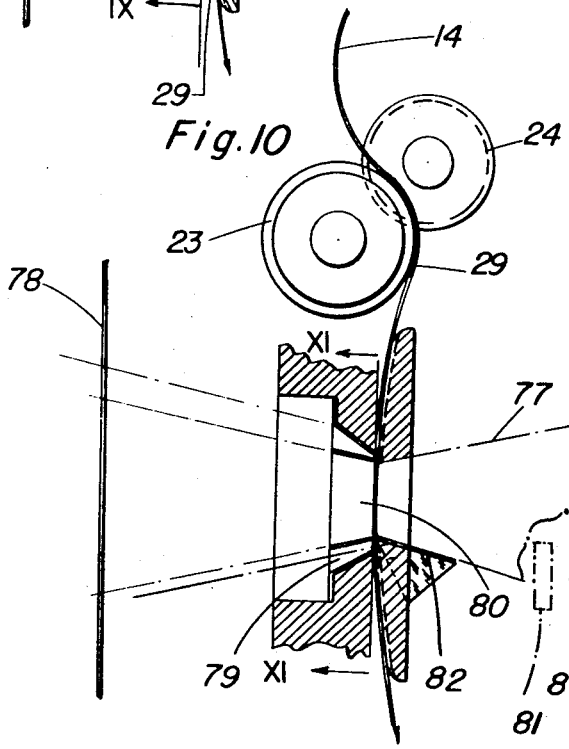
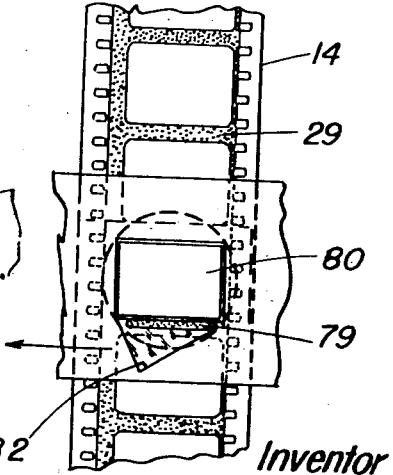
Inventor
Ewald Boecking
BY HIS ATTORNEYS
Howson and Howson Patented Mar. 9, 1948

2,437,239

UNITED STATES PATENT OFFICE 2,437,239

FILM REGISTRY MEANS FOR MOTION-PICTURE PROJECTORS

Ewald Boecking, Great Kills, N. Y., assignor to Manufacturers Machine & Tool Co., Inc., Mount Vernon, N. Y., a corporation of New York Application April 12, 1945, Serial No. 587,943

3 Claims. (Cl. 88—17)

This invention relates to film registry means for a motion picture projector. In the usual motion picture projector in which the film advances intermittently, it is quite difficult for the operator to get the film in proper registry with the light aperture lengthwise of the film when the film is being first threaded in the machine, and he has no convenient way of knowing when the film gets out of registry while the machine is running, except by observing the picture on the screen. The object of the invention is to provide simple and convenient means indicating when the film is in proper registry. It is characteristic of the invention that the condition of the film with regard to registry determined by means above and separate from the gate at a fixed distance above the intermittent sprocket.

In the drawings:

Figure 2 is a view in vertical section in a plane parallel to the film through the novel threading registry means of the embodiment shown in Figure 1, taken on the line II of Figure 1;

Figure 3 is a view in longitudinal section of the casing containing the light apertures of my novel mechanism shown in Figures 1 and 2;

Figure 4 is a view in elevation from the right side of Figure 2, of the ratchet means controlling the rotation of the casing of Figure 3;

Figure 5 is a plan view, partly disassembled, of the teeth and end of the contact spring shown in Figure 4 for making and breaking current to the light source;

Figure 6 is a view in horizontal section through the core of the casing of Figure 3, showing the teeth and blade for rotating the casing;

Figure 7 is a view in side elevation similar to Figure 1 of a modified form of registry means combining a visual indicator used when threading up the machine and an electrical indicator for use while the machine is running;

Figure 8 is a view in vertical longitudinal section through the film gate of a preferred form of my registry means in which an electrical indicator uses the film projecting light as its light source;

Figure 9 is a view in end elevation of the light aperture of the modification of Figure 8, taken on the line IX—IX of Figure 8;

Figure 10 is a view similar to Figure 8 of a further modified form of my registry means in which a visual indicator uses the film projecting light as its light source; while Figure 11 is a view similar to Figure 9 showing the light aperture of the modification shown in Figure 10, taken on the line XI—XI of Figure 10.

Figure 1:
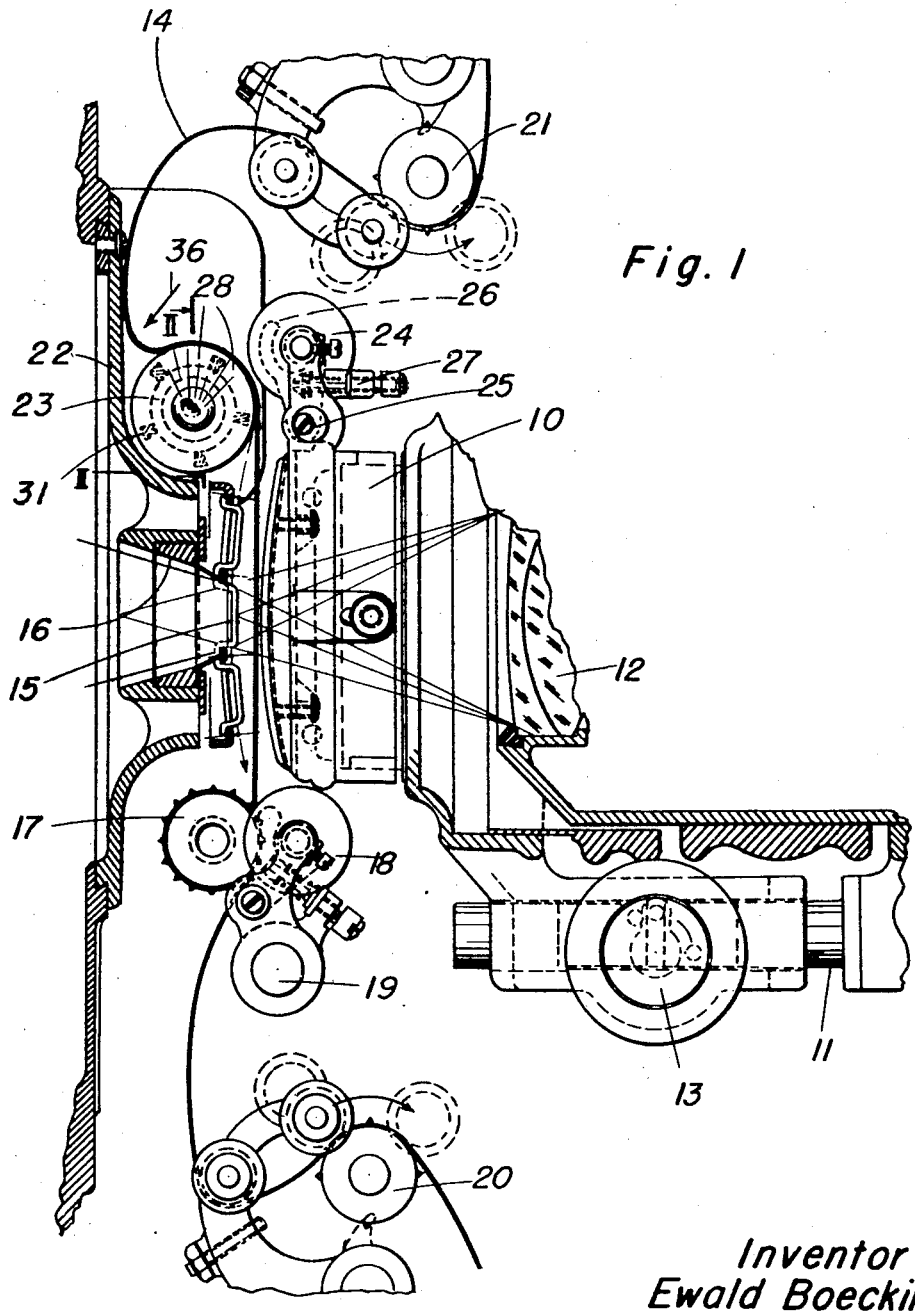
Figure 1 is a view in side elevation, partly cut away, of a film gate and associated parts of a projector embodying one form of my novel registry means, the gate being shown open and the view being taken on the line I—I of Figure 2, looking in the direction of the arrows.

In a commercial motion picture projector in which the film advances intermittently, it is a somewhat complicated process to thread up the machine at the beginning of the film. In threading up the machine heretofore, the operator had to hold the film at the light aperture and try to peek into the film gate to see that it was in registry. Then, while holding the film stationary at that point, he had to thread it onto the intermittent drive sprocket and shut the film gate without catching his fingers which were still holding the film in the gate. Again, after the machine had been properly started, there was no convenient way by which examination of the machine would tell the operator whether the film had stayed in registry or been thrown out of registry by the film jumping or by improper patching of the film.

I have invented a construction by which the operator has indicating means which will signal when the film is not in proper registry. These means may be visual, audible or electrical.

I shall first describe the form in which the registry condition at the light aperture of the machine is signalled visually above the film gate. As shown in Fig. 1, there is the usual film gate 10 movably mounted on bar means 11 and carrying with it lenses 12 shown at the right of the figure. The film gate has the usual projection aperture corresponding to the light aperture 16 hereinafter referred to. The source of light, of course, is to the left of the lenses 12 and the screen is some distance to the right, as shown in this figure. Movement of the film gate 10 and its mount 11 is controlled by mechanism 13 which need not be described here, it being sufficient to point out that the purpose of making the film gate 10 movable toward and away from the film is to facilitate threading up of the machine. I have shown the film gate in its retracted position. The film 14 lies between the film gate, on the one hand, and the pressure shoes 15 and light aperture 16, on the other. It will be noted that the film gate presents a vertically convex surface to the film and that the pressure shoes 15 present a surface which is concave to match the concavity of the film gate. This is for the purpose of holding the film in proper position for projection, as described in my co-pending application Serial No. 567,967, filed December 13, 1944. The usual intermittent driving sprocket wheel 17 with its pad roller 18 pivotally mounted about the center 19 is shown below the film gate. Below that sprocket wheel 17 is shown the lower pad roller 20 in its open position which, when the machine is running, transforms the intermittent movement of the film back to continuous movement. Above the film gate, and separate therefrom, is the corresponding upper pad roller 21—also shown in open position—which feeds the film forward continuously. It should be noted that these two rollers being shown in open position in Fig. 1, the slack loops adjacent them do not appear in their running condition. The purpose in having these rollers shown in their open position is to illustrate more clearly the simplicity of getting the film into registry by use of the novel means which I have invented and will now describe.

Above the usual plate 22 which carries the pressure shoes 15, and on the opposite side of the film 14 from the film gate 10, is a hold-back roller 23 which is the casing of my registry means. To hold the film in contact with this casing while the machine is running, there is a lateral guide roller 24 mounted on the film gate by means of a horizontal shaft 25, and a double guiding yoke 26 adapted to overlie the lines of the sprocket holes on the two sides of the film 14. The upper end of this yoke is pressed against the film by adjustable spring means 27 in a manner similar to the spring 23 and screw 25 of my co-pending application Serial No. 560,654, filed October 27, 1944, now Patent Number 2,429,918, issued November 28, 1947. The casing 23 contains around its periphery one or more apertures 28, there being five such apertures indicated in Fig. 1 and each aperture being the exact size of a picture on the film. The diameter of the casing is so calculated that the amount of metal between any two openings is equal to the space or bar 29 between two adjacent pictures 30 (see Fig. 2) on the film so that the circumferential distance around the roller from say the upper edge of one opening 28 to the upper edge of the next opening is equal to the length of a film frame. As shown in Fig. 1, each rib 31 between two openings 28 in the casing is bevelled on the sides so as to maintain a space of uniform width for the passage of light from the center of the casing. This casing is so located and of such a length that it extends across the full width of the film and on the side on which it is mounted extends for some distance beyond the film, as can be seen in Fig. 2. The casing is hollow and the hollow space 32 opposite the film is large enough to contain an electric light bulb 33 whose base is screwed into a screw shell 34 with a center screw contact 35 constituting the socket inside the casing. It will be seen that by providing suitable electric current for the light bulb when the film is held in contact with the periphery of this roller or casing, the relation of the nearest picture on the film to the aperture 28 facing the roller 24 can be ascertained at a glance.

The casing is mounted separately from the film gate and above it. It does not move when the film gate is retracted for threading up the machine. The casing is in such a position that when the film gate is open the film passing over the casing goes in a straight line to the intermittent sprocket 17 without touching the curved gate at all. The film does not register properly with the light aperture 16 under these conditions. The spacing of the casing is from the intermittent sprocket and is such that when the film is meshed with the teeth of the intermittent sprocket the film will be in register with one of the openings 28 of the casing. In this way the adjustment of the film at the light aperture is determined across the light aperture 16 although the film is not yet in proper register to check at the aperture itself. I find that the difference in length of path of the portion of film between the intermittent sprocket and my casing due to the curvature of the film gate is so slight that it does not interfere with the casing being used as a check for the meshing with the proper teeth on the intermittent sprocket, both when the gate is open and when it is closed. The registry of the film with the light aperture is accurate, of course.

I will now describe the operation of threading up the projector when using my novel registry means of Figs. 1 to 6. Assuming that the upper roller 21, lower roller 20 and intermittent driving sprocket wheel 17 are open, an adequate length of film is taken off the reel, the film led around the upper roller 21 over the casing 23 of my film registry means between the gate and pressure shoes 15, and through the sprocket wheel 17 and the lower roller 20. The sprocket wheel 17, which has its pad roller 18 close against it, thus holds the film in a definite position as far as concerns registry with the light aperture. It will be observed that with the exception of this one sprocket wheel 17, the film can still be moved through any of the other elements with which it has been put in contact. The operator then grasps the film with his finger at the point marked with the arrow 36 in Fig. 1 and the film is held down around a portion of the periphery of the casing 23. Assuming that the bulb 33 has been turned on, the operator can see whether the film is in registry. If it is not, he can move the film to another sprocket hole on the wheel 17 or can make adjustment by the usual film framing device which is found on practically all modern machines to take up slight erors in adjustment when the machine is running. If desired, the operator can check with the registering means before putting the film on the teeth of the intermittent driving sprocket wheel. When the picture opposite the opening 28 in the casing is in registry with the opening, the operator is assured that the picture opposite the light aperture in the film gate will be in registry when the gate is closed and the threading of the machine can be completed. The film gate is then closed and the proper size of slack loops formed between the threading loops and the upper sprocket wheel or roller 21, and then the necessary slack loop between the intermittent sprocket wheel 17 and the continuous lower roller 20 obtained, and the machine is ready to be run.

The manner in which these slack loops can be obtained by the use of the particular upper and lower sprocket rollers 20, 21 is not part of the present invention and therefore need not be described here. I will now turn to a description of the features of my invention which center about the turning of the casing to bring up different apertures.

I provide these apertures for two purposes: first, as a convenient means of turning the light on and off and, secondly, to insure that the wear of the film on the casing because of its hold-back function is distributed evenly around the casing. To this end the casing 23 is a roller adapted to turn about the longitudinal or horizontal axis on which it is mounted, in a step-by-step manner. This movement, shown in the drawings, is such that at each two steps which the roller turns, the next aperture 28 is facing the roller 24. In other words, each two steps that the roller turns correspond to a peripheral distance of one film frame on the roller. This turning is obtained conveniently by means of a knob 37 set in the end of the roller 23, as shown at the left of Fig. 2. This knob 37 can be removed from the recess 55 in the end of the casing to give access to the bulb. The knob is split longitudinally and contains a wedging screw 59 to wedge the knob in place by expansion against an internal shoulder 58 (Fig. 2).

The control of this turning of the roller and turning on and off of the electric current centers around a light-contacting ratchet gear 38 and a positioning or insulating ratchet gear 39 and their companion contact spring 40 and hold-back arm 41, shown in Figs. 2, 5 and 6. These ratchet gears 38, 39 are mounted on the other end of the casing from the knob 37. As shown in the drawings, the insulating ratchet gear 39 is between the casing and the electrical ratchet gear 38.

I will now describe the manner in which the hold-back roller is mounted. The roller is attached to the frame of the machine by means of a stationary casting or bracket 42 which is clamped around the small or supporting end by a clamp 43 and screw 44. In order that this mounting may be adjustable with relation to the film, an adjustment tube 45 is interposed between the clamp 43 and the outside of the sleeve 46 of the casing. To hold the sleeve 46, adjustment tube 45 and clamp 43 against lateral separation, one end of the adjustment tube rests against the adjacent enlargement or shoulder 47 on the casing which occurs where the casing is enlarged to contact the film. The other end of the adjustment tube abuts against a spring washer 48 taking into a notch 49 in the free end of the sleeve of the casing. This spring washer 48 has an external circumference greater than the internal diameter of the clamp 43 so that even if the screw 44 is loosened the casing cannot come out of the clamp until the spring washer is removed. Relative longitudinal movement between the adjustment tube and the sleeve of the roller is also impossible until the washer is removed.

The screw shell 34 in which the electric light bulb 33 is placed is mounted at one end of a core 50 which fills the center of the sleeve 46 of the casing except for a recess at the aperture end for the screw shell. This core 50 is held against removal from the sleeve by a screw 51 passing through the sleeve from the outside but not through the adjustment tube 45 (see Figs. 2 and 3). The core is made of insulating material such as formica and the insulating or advancing ratchet gear 39 is integral therewith on the outer end of it. It is larger in diameter than the balance of the sleeve but no portion of it projects radially outward into the path of the clamp. The electrical contact ratchet gear 38 is mounted outside the insulating ratchet gear 39 and is held at an axially central point by the center contact screw 35 for the light bulb. This screw extends through from the screw shell end of the core to the outside surface of the electrical contact gear 38. To permit an exact adjustment of this longitudinal contact circumferentially, a small set screw 53 taking into a depression in the insulating gear 39 is provided. The electrical contact ratchet gear 38 can be made of bronze, if desired. This gear, like the insulating ratchet gear 39, does not extend radially into the patch of the clamp 43. It therefore will be seen that to disassemble the hold-back roller which is composed of the parts just described, it is necessary merely to remove the spring washer 48, loosen the clamp screw 44 and withdraw the casing and associated parts toward and past the film location by pulling at the knob 37. The adjustment tube 45 can then be turned to bring an opening (not shown) opposite the screw 51 in the sleeve 46, thus freeing the core 50 to be withdrawn from the free end of the sleeve.

I will now describe more fully the ratchets and electrical circuits cooperating with the ratchet gears 38 and 39 to provide accurate stopping of the light apertures in the casing and to provide the make-and-break of the electric current for the light source in the casing. I provide the insulating stop or hold-back arm or blade 41 of comparatively rigid material fixedly depending from a pin 52 pivotally mounted above the two ratchet gears 38, 39 on the stationary casting 42. This pin is insulated from the casting by washers 56 and sleeve 57 so that there is no electrical connection between the casting and frame of the machine and the clamp screw, on the one hand, and the means mounting this stop blade 41, on the other hand. This blade may be comparatively rigid and made of any phenolic or other desired compound, provided the same has a moderate amount of resilience to permit it to be drawn over the teeth of the insulating ratchet gear 39 as the latter is turned, and will fall in behind each tooth as it passes. It will be obvious from the drawings that the direction of rotation of these ratchet gears 38, 39 is opposite to that of the direction of movement of the film so that when the operator, by turning the knob 37, causes one of the teeth on the gears to pass the stop blade 41, the contact with the film will immediately press the vertical back face of the tooth against the end of the stop blade, thus accurately positioning a light aperture 28 with relation to the distance to the light aperture 16 in the film gate and the dimensions of the frames in the film. I prefer to mount the electrical contact spring for providing the light on the same pin which carries the insulating stop blade 41 and therefore I have shown in the drawings a contact spring 40 screwed to the sleeve by the same screw 54 that holds the stop blade on the pin 52. This contact blade is somewhat longer than the stop blade 41 and, being on the side of the stop blade away from the axis of rotation of the two ratchet gears, although it is opposite both ratchet gears like the insulating blade 41, it is limited and controlled by the stop blade as follows:

It may be observed that while the insulating and electrical ratchet gears 39, 38 have the same number of teeth and the same radial diameter for the teeth, the teeth on any one gear are apart a distance equal to two teeth and the two gears are set so that looked at from the end of the hold-back roller, the teeth are in staggered position (see Fig. 4). The stop blade 41 being the width of and lying opposite both ratchet gears, it engages alternately behind a tooth on the insulating gear and a tooth on the electrical gear as the hold-back roller is rotated. As shown, there are five teeth on each ratchet gear and five light apertures in the casing. Since the teeth are set in the equally spaced staggered relation described, it follows that in one rotation the casing is stopped ten times. On every other movement forward it will be seen that the tooth which the spring 40 contacts or lies on top of will be a tooth on the electrical ratchet gear 38. This is the position shown in Fig. 4. In this position the blade 40 is in contact with a tooth on the electrical ratchet wheel 38 but when the ratchet wheels are advanced one tooth further, the blade will be out of contact with the teeth on the electrical ratchet wheel and merely lying on top of the insulating gear 39. Thus, as the casing is turned, the electrical circuit is alternately made and broken. It will be seen that the light source will be turned on five times in each complete rotation of the casing. The parts are so set that this occurs when the casing is in registry position with the film while the latter is being projected, as above mentioned, and that when the current is off, the casing is advanced half way to registry position for the next aperture. The electric circuit thus completed by the spring contact 40 is composed of the screw 54 holding the contact on the sleeve, the screw 52 holding the blades 40 and 41 on the casting 42, a wire 60 connected to the other end of the screw 52 on the opposite side of the casting, a source of current which may be say from six to twenty-five volts, and a ground wire 61 attached to the casting which transmits the current through the clamp to the screw shell in any well-known manner.

It will be noted that while the embodiment shown in Figs. 1–6 moves the handling and registry of the film to a place where the operator can thread the machine without awkwardness or danger to his fingers, it also provides a visual check on the registry of the film while the machine is running. This visual signalling of the accuracy of the registry of the film may be obtained not only by looking directly at the film as it passes over the slot or aperture in the holdback roller, but if desired such image can be reflected by a mirror or other means to any desired position or dimension. When using the roller 23 of Fig. 1 for a visual indication of registry while the machine is running, the operator looks at the rib 31 between the openings 28 which are facing upwardly and the lower guide roller (24) opening and yoke 26 for the casing. The operator can see this rib over the top of the roller and yoke. By watching the rib—and more particularly its upper edge—the operator can see if the space or bar 29 on the film is in registry with the rib of the casing. (The approximate running position of the film can be seen in Fig. 7.)

If it is desired to obtain some indication other than visual of the condition of the film while the machine is running, an electrical impulse or an audible signal can be obtained (Fig. 7). The casing 63 in this embodiment has only two openings and does not revolve. One of these is an opening 64 facing upwardly which is the same size as one of the openings 28 in the embodiment of Figs. 1 to 6, and this is used to obtain registry when threading up the machine. When detecting faulty registry while the machine is running, a small slot 65 facing almost horizontally just under the pad roller 24 is used. The slot is slightly less than the size of the space or bar 29 between two pictures on the film and is spaced a multiple of the film frame above the corresponding bar just above the picture in the light aperture. It will be seen that while the frame at the light aperture is being projected, a bar 29 of the film is over the slot 65. This bar, of course, covers the slot, cutting off the light from the light source 67 inside the casing. If the film is out of registry, obviously light will escape and can be translated into electrical impulses by a selenium cell 67 in a jacket 71 on the frame of the machine. The wires 69 carrying the current for the selenium cell can transmit the electrical indications to any desired electrical equipment, whether it be operating or signalling equipment. Thus, for example, the electrical impulses can be used to operate automatic film framing mechanism.

The light source 67 in the casing 63 is shown as a neon or gaseous discharge light. It will be obvious that unless the light is extinguished while the film is advancing from one position to the next, the selenium cell 68 will be operated when it should be idle. Stroboscopic control of the circuit 66 supplying alternating current to the light can be used to take care of this, or a switch in the circuit can be connected to the light shutter of the projector. However, I have indicated another alternative in Fig. 7 where there is shown a half-wave rectifier 70. This gives current which is interrupted sixty times per second. Each pulse of current takes place in one one-hundred-twentieth of a second and that is equal to the time it takes for the film to be advanced from one frame to the next.

In Figs. 8, 9, 10 and 11 I have shown two simplied embodiments of my invention in which the light source for my indicator is the arc light which projects the picture on the screen.

In Fig. 8 there is a photo-cell 72 similar to the photo-cell 68 in Fig. 7 except that it is located down in the film gate with its opening 73 directed toward the bar 29 just above the picture which at that moment is in the light aperture 75. The slot to direct the source of light against the bar to detect any irregularities in the registry is an opening 74 in the aperture plate just above the regular light aperture (Figs. 8 and 9). This slot may be formed with tapered walls as shown, so as to take in only excess which normally would not go through the regular light aperture. By this I refer to the light cut off when the aperture 75 or 80 cuts the beam from a circle to an oblong. When the registry of the film is bad the light rays going through the slot 74 hit a reflector 76 which deflects the light into the slot 73 and to the selenium, i. e., photoelectric, cell 72. As shown in the drawings, the light beam 77 coming from the left of the figure is interrupted by the shutter 78 so that the beam used to indicate the registry faults will not reach the cell when the film is moving. The cell is wired in the same manner as the one in Fig. 7. Of course, it can be used to produce visible, audible or electric current indications as desired. I prefer to use the picture projecting light in carrying out my invention, and the construction shown in Figs. 8 and 9 is the preferred form of the two arc light embodiments.

In Figs. 10 and 11 is shown an embodiment in which the light which projects the film on the screen also operates a visible form of registry indicator. As in Figs. 8 and 9, a slot 79 is formed in one edge of the light aperture 80—this time in the lower edge. As can be seen in Fig. 11, the slot is tapered down to the same size as the bar 29 between two pictures on the film. The slot takes excess light and not useful light which otherwise would go in the main light aperture 80. On the film gate opposite this slot 79, instead of a passage leading to a photo-electric cell, there is a reflector 82. This turns any light beams coming through the slot 79 and the film horizontally at right angles. These beams of light strike on the usual glass door 81 on the side of the projector opposite the film gate. At the point where such rays would strike a red dot, a red line or other symbol can be painted. When this is illuminated the operator can see it almost anywhere in the projection booth and will know the film is out of registry.

It will be noted that either of the two defined portions of the film, namely, the picture or the bar between pictures, may be used to give a check on the registry of the picture in the light aperture. If it is desired that the operator see the actual registry condition of the film, then a direct visual check is obtained from a picture portion of the film (Figs. 1 to 6). When it is not considered necessary that the operator see the actual picture, then the bar between pictures is used either to give a visual indication as in Figs. 10 and 11 or to give indirect indications such as are obtainable from the photo-electric cell (Figs. 7 to 9).

It will be seen that according to my invention the indications of film registry are taken from points above or below the picture being projected and by means of a light source can give any desired type of indication.

What I claim is:

1. An intermittent motion picture projector having a retractable curved film gate with the usual projection aperture, and an intermittent sprocket below the film gate, in combination with a hold-back roller above and mounted separately from the gate a fixed distance above the sprocket, said roller having a casing with one or more slots therethrough over which the film can pass in a straight line to the sprocket without touching the gate when the gate is retracted, a light source inside said casing to project light through said openings, the distance from the casing to the sprocket being such when the gate is retracted that the film is in register with one of the openings when the film is properly meshed with the teeth of the sprocket, the aperture in the curved film gate being so located that it is in register with the film when the gate is closed.

2. A motion picture projector in accordance with claim 1 in which said casing has a plurality of apertures to project an image of light approximately the size of a picture frame against the film to be threaded, and means for extinguishing the light source adapted to cause rotary successive steps of said casing of half a film frame in a direction opposite to the film travel so that the light source is turned on when film is threaded and may be turned off and on when film is moving.

3. A motion picture projector in accordance with claim 1 in which there are means associated with the casing adapted to cause step-by-step turnings of the casing and thereby successively turn the light source off and on, the steps where the light source is on being ones in which the openings are identical with a picture frame, whereby a visual check on the film is obtained and the wear of the casing due to film friction is kept even.

EWALD BOECKING.

REFERENCES CITED

The following references are of record in the file of this patent:

UNITED STATES PATENTS

| Number | Name | Date |
|---|---|---|
| 2,132,003 | Holst | Oct. 4, 1938 |
| 1,348,566 | Jenkins | Aug. 3, 1920 |
| 1,433,475 | Porter | Oct. 24, 1922 |
| 1,486,226 | Capstaff | Mar. 1, 1924 |
| 1,956,418 | Flinker | Apr. 24, 1934 |
| 1,491,017 | Malm | Apr. 22, 1924 |
| 2,192,987 | Runge | Mar. 12, 1940 |

FOREIGN PATENTS

| Number | Country | Date |
|---|---|---|
| 467,161 | Germany | Oct. 19, 1928 |
| 367,388 | Germany | Jan. 20, 1923 |